(12) United States Patent
Alkkiomäki et al.

(10) Patent No.: US 11,899,440 B2
(45) Date of Patent: Feb. 13, 2024

(54) REMOTE MONITORING

(71) Applicant: ABB Schweiz AG, Baden (CH)

(72) Inventors: Olli Alkkiomäki, Helsinki (FI); Teemu Tanila, Helsinki (FI); Joni Siimesjärvi, Helsinki (FI)

(73) Assignee: ABB Schweiz AG, Baden (CH)

( * ) Notice: Subject to any disclaimer, the term of this patent is extended or adjusted under 35 U.S.C. 154(b) by 497 days.

(21) Appl. No.: 17/061,794

(22) Filed: Oct. 2, 2020

(65) Prior Publication Data

US 2021/0103277 A1    Apr. 8, 2021

(30) Foreign Application Priority Data

Oct. 2, 2019    (EP) ...................................... 19201036

(51) Int. Cl.
*G05B 23/02* (2006.01)
*G06N 20/00* (2019.01)
*G06F 16/903* (2019.01)

(52) U.S. Cl.
CPC ... *G05B 23/0283* (2013.01); *G06F 16/90335* (2019.01); *G06N 20/00* (2019.01)

(58) Field of Classification Search
CPC .......... G05B 23/0283; G06F 16/90335; G06F 9/5072; G06F 16/2462; G06N 20/00; Y02D 10/00; G06K 9/6256
See application file for complete search history.

(56) References Cited

U.S. PATENT DOCUMENTS

| | | | |
|---|---|---|---|
| 11,181,872 B1* | 11/2021 | Herring, III | D21F 7/00 |
| 2018/0136285 A1 | 5/2018 | You et al. | |
| 2020/0265331 A1* | 8/2020 | Tashman | G06N 20/00 |
| 2021/0072736 A1* | 3/2021 | Gomes | G05B 19/41835 |

FOREIGN PATENT DOCUMENTS

| | | |
|---|---|---|
| EP | 3188041 A1 | 7/2017 |
| WO | 2019182894 A1 | 9/2019 |

OTHER PUBLICATIONS

European Patent Office, Extended Search Report issued in corresponding Application No. 19201036.1, dated Apr. 29, 2020, 11 pp.

* cited by examiner

*Primary Examiner* — Charles R Kasenge
(74) *Attorney, Agent, or Firm* — Leydig, Voit & Mayer, Ltd.

(57) ABSTRACT

To provide a status information also to one or more industrial devices for which no process data is available, a machine learning model is trained by using process data of a subset of industrial devices, corresponding product data, and statuses obtained by performing remote monitoring analysis to the process data. When user input including first information, which at least indicate at least one industrial device type is received, product data of one or more industrial automation devices, which are of the same indicated industrial device type is retrieved and inputted to the trained model, which outputs one or more estimated statuses.

15 Claims, 2 Drawing Sheets

REMOTE MONITORING

RELATED APPLICATIONS

This application claims priority to European patent application no. 19201036, filed on Oct. 2, 2019, the contents of which is hereby incorporated herein by reference in its entirety.

FIELD

The present invention relates to remote monitoring on industrial devices.

BACKGROUND ART

The evolvement of networking between computers and measurement devices, especially different sensors, capable of communicating without user involvement, has increased the amount of data collected on equipment and processes. The Internet of Things (IoT) is the networking of physical devices (also referred to as "connected devices" and "smart devices"), such as vehicles, home appliances, machines, computers and other items that are embedded with electronics, software, sensors, actuators, and network connectivity that enable these objects to collect and exchange data. IoT allows objects to be sensed and/or controlled remotely across existing network infrastructure. The Industrial Internet of Things (IIoT) is the use of IoT technologies in the manufacturing industry. It incorporates machine learning and big data technology, harnessing the sensor data, machine-to-machine communication and automation technologies that have existed in industrial settings for years. IIoT also provides mechanisms to connect industrial devices to a cloud computing platform and to transfer information to the cloud platform for performing various operations, such as remote monitoring, for example for predictive maintenance, on the industrial data. However, not all industrial devices are configured to collect and transfer data. Hence, no remote monitoring is available for those industrial devices.

BRIEF DESCRIPTION

An object of the invention is to facilitate remote monitoring by means of methods, non-transitory computer readable storage mediums, an apparatus and a system, which are characterized by what is stated in the independent claims defines. Further embodiments are disclosed in the dependent claims.

According to an aspect, with a help of a trained model, it is also possible to obtain estimated predictions, i.e. estimated remote monitoring results, also for industrial devices whose process data is not available.

According to an aspect, the trained model is trained by using process data of a subset of industrial devices, corresponding product data, and predictions obtained by performing remote monitoring analysis to the process data.

BRIEF DESCRIPTION OF THE DRAWINGS

In the following, exemplary embodiments will be described in greater detail with reference to accompanying drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Different embodiments and examples are described below using single units, models, equipment and memory, without restricting the embodiments/examples to such a solution. Concepts called cloud computing and/or virtualization may be used. The virtualization may allow a single physical computing device to host one or more instances of virtual machines that appear and operate as independent computing devices, so that a single physical computing device can create, maintain, delete, or otherwise manage virtual machines in a dynamic manner. It is also possible that device operations will be distributed among a plurality of servers, nodes, devices or hosts. In cloud computing network devices, computing devices and/or storage devices provide shared resources. Some other technology advancements, such as Software-Defined Networking (SDN), may cause one or more of the functionalities described below to be migrated to any corresponding abstraction or apparatus or device. Therefore, all words and expressions should be interpreted broadly, and they are intended to illustrate, not to restrict, the embodiment.

Figure 1:
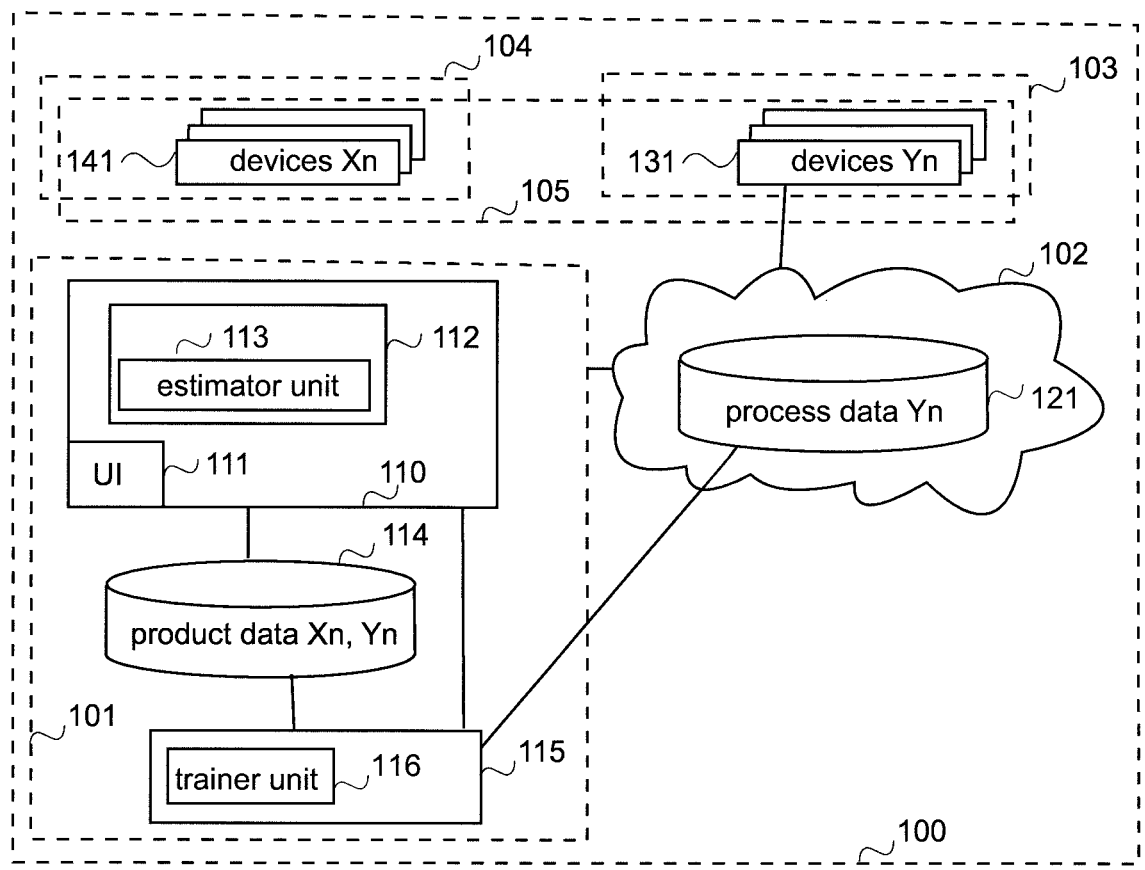
FIG. 1 shows a simplified architecture of a system.

A general exemplary architecture of a system is illustrated in FIG. 1. FIG. 1 is a simplified system architecture only showing some equipment (apparatuses, devices, nodes) and functional entities, all being logical units whose implementation and/or number may differ from what is shown in FIG. 1. The connections shown in FIG. 1 are logical connections; the actual physical connections may be different. It is apparent to a person skilled in the art that the systems also comprise other equipment, functional entities and structures, some of which used in or for big data, data management, and communication in the system or in one part of the system. They, as well as the protocols used, are well known by persons skilled in the art and are irrelevant to the actual invention. Therefore, they need not to be discussed in more detail here.

In the illustrated example of FIG. 1, a system 100 comprises a remote site 101, a cloud platform 102, one or more online industrial sites 103, one or more offline industrial sites 104, and one or more mixed sites 105.

The remote site 101 depicts herein one or more sites offering remote services, for example remote monitoring services. The remote site 101 may be a service center provided by an enterprise manufacturing different industrial devices 131, 141 locating in the industrial sites 103, 104, without limiting the solutions to such sites.

In the illustrated example the remote site 101 comprises one or more apparatuses 110 (only one illustrated in FIG. 1) configured for virtual remote monitoring, the apparatus comprising one or more user interfaces 111 for user interaction, and a remote monitoring tool 112 comprising an estimator unit 113.

The remote monitoring tool 112 is an analytic tool, that may be based on data mining, self-learning artificial intelligence, mathematical models of an industrial process used, etc. The remote monitoring tool 112 may be a condition monitoring tool configured, for example, to identify in one or more condition parameters changes indicative of a developing fault. Another example of a remote monitoring tool 112 includes a remote performance optimization tool, for example, to identify sources of issues indicative of increased energy consumption, and/or increased emissions. The purpose and actual functionality of the remote monitoring tool and its internal structure are not relevant for the invention and therefore the internal structure and actual functionality of the remote monitoring tool 112 are not described in more detail here. It is obvious for one skilled in the art that any known or future remote monitoring tool may be used. However, to be able to perform the virtual remote monitoring, the remote monitoring tool 112 illustrated in FIG. 1 comprises the estimator unit 113. The estimator unit 113 is a trained machine learning model, whose training and functionality will be described in more detail below. Even though in the illustrated example of FIG. 1, the estimator unit 113 is comprised in the remote monitoring tool 114, it may be a separate tool, run independently of the remote monitoring tool.

In the illustrated example of FIG. 1, the remote site 101 further comprises a data storage 114 and an apparatus 115 comprising at least a trainer unit 116 configured to train at least the estimator unit 113, as will be described in more detail below with FIG. 2.

The data storage 114 is a product data storage, containing at least basic information on industrial devices Yn 131 and Xn 141. The industrial devices whose information is in the product data storage may be industrial devices manufactured by a company providing remote support via the remote site. The industrial devices Yn 131 and Xn 141 may be installed at the industrial sites 103, 104, 105 and/or waiting to be installed. Examples of a basic product information comprises product serial number, product type, product configuration, manufacturing date, components in the product with their key dates, installation environment, expected loading, industrial application (purpose of use), etc., naturally depending on the industrial device.

The one or more online industrial sites 103 comprises industrial devices Yn 131 that are configured to collect process data and to transfer (transmit) it to a shared database 121 in the cloud platform. The process data comprises measurement results on the industrial device and/or one or more its operations and/or its environment, for example control signals sent and/or received and room temperature. The one or more offline sites 104 comprises industrial devices Xn 141 that are not configured to transfer measurement results to the shared database, and it may be that one or more of the industrial devices Xn 141 in the offline site 104 are not even configured to collect data. The one or more mixed sites 105 comprises both kind of devices, i.e. one or more devices that are configured to collect and transfer (transmit) process data, and one or more devices that are not configured to transmit process data, possibly not even configured to collect any data. It should be appreciated that an industrial site 103, 104, 105 depicts herein any industrial site comprising one or more industrial devices 131, 141, and there are no limitations what constitutes an industrial device. A non-limiting list of examples of industrial sites includes power plants, manufacturing plants, chemical processing plants, power transmission systems, mining and mineral processing plants, upstream oil and gas systems, data centers, ships, transportation fleet systems and utility plants. An industrial device may be an industrial automation device, for example. An industrial automation device refers to electronic equipment that is used for controlling one or more industrial processes. For example, industrial automation devices may control the position, speed, torque and/or direction of electric motors in conveyors, grinders, winders, pumps and/or fans. The industrial automation device may control the speed and/or torque of a motor by changing the frequency, current and/or voltage of the electrical supply to the motor, for example. Naturally, the motor itself is an industrial device. A non-limiting list of examples of industrial automation devices includes drives, frequency converters, AC/DC converters, DC/AC converters, DC/DC converters, programmable logic controllers, switches, motion controllers or motion drives, servo motors, soft starters, wind turbines and solar inverters.

The product data storage 114, depicting one or more data storages, and the process data storage 121, depicting one or more data storages, may be any kind of conventional or future data repository, including distributed and centralized storing of data, managed by any suitable management system. An example of distributed storing includes a cloud-based storage in a cloud environment (which may be a public cloud, a community cloud, a private cloud, or a hybrid cloud, for example). Cloud storage services may be accessed through a co-located cloud computer service, a web service application programming interface (API) or by applications that utilize API, such as cloud desktop storage, a cloud storage gateway or Web-based content management systems. In other words, a data storage 114, 121 may be a computing equipment, equipped with one or more memories, or a sub-system, or an online archiving system, the sub-system or the system comprising computing devices that are configured to appear as one logical data storage for devices (equipment, apparatuses) that store data thereto and/or retrieve data therefrom. However, the implementation of the data storage 114, 121 the manner how data is stored, retrieved and updated, i.e. details how the data storage is interfaced, and the location where the data is stored are irrelevant to the invention. It is obvious for one skilled in the art that any known or future solution may be used.

Naturally the system 100 comprises, even though not illustrated in FIG. 1, one or more networks over which one or more industrial devices 131 and/or the one or more apparatuses 110, 115 at the remote site may connect to the cloud platform 102 to access process data 121 and/or connect from the remote site 101 to an industrial site 103, 105 for remote monitoring.

It should be appreciated that the system illustrated in FIG. 1 is just an example, and other ways to locate different described functionalities may be used as well. For example, an offline site 104 may comprise an apparatus configured for virtual remote monitoring by having the estimator unit as a separate unit (i.e. without any remote monitoring tool) and with access to product data on devices at the offline site. In another example, the product database 114 locates also at the cloud platform 102 and the apparatus 115 comprising the trainer unit 116 locates on a site that is separate from the remote site 101.

Figure 2:
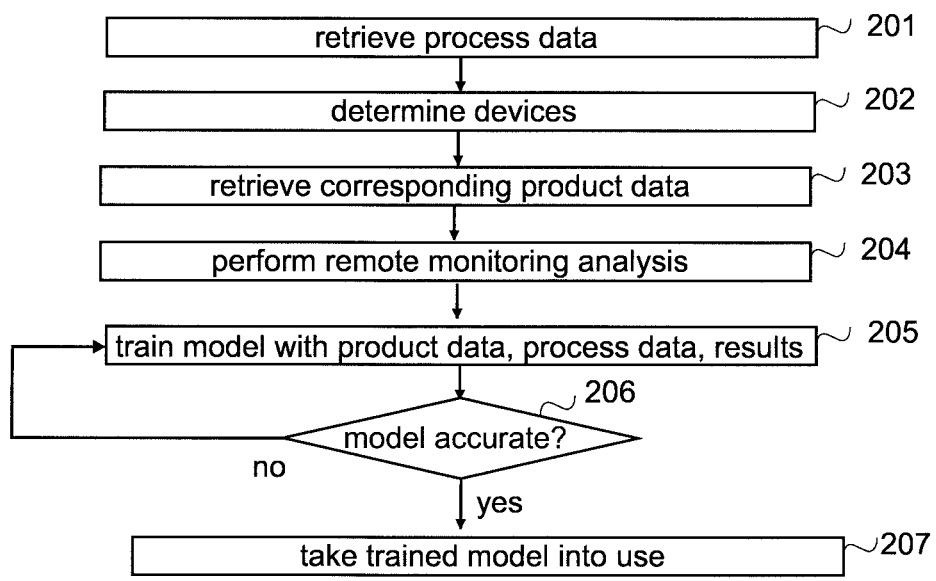
FIGS. 2 to 5 are flow charts illustrating examples of functionalities.

FIG. 2 illustrates an example functionality of an apparatus configured to create, and/or (re)train the estimator unit. More precisely, it describes an example of how the trainer unit operates. The example functionality describes basic principles used to create, train and retrain, when need arises, the estimator unit. In the example it is assumed that there are enough process data that can be used as training data and validation data to create/update the trained model. The trained model illustrated utilizes, i.e. is based on, machine learning. A wide range of such algorithms are available and any of them, or any corresponding future algorithms may be used as a basis for the trained model. The machine learning may be classification, using an artificial neural network, or a support vector machine, or regression, to name couple of examples. Naturally, any other machine learning, such as image learning, rule-based learning and explanation-based learning, may be used.

Referring to FIG. 2, process data is retrieved in step 201 from the process database. Then the industrial devices whose process data was retrieved are determined in step 202, and, using the device information, product data of those devices is retrieved in step 203 from the product database. Using the example of FIG. 1, process data is retrieved, devices Yn determined, and product data of devices Yn is retrieved. The product data may comprise all data of a device stored into the product database, or a predefined subset of the product data. A non-limiting list of a predefined subset comprises country, customer, site, industrial application, installation date.

Meanwhile, in step 204, remote monitoring analysis is performed to the retrieved process data. The remote monitoring analysis is performed with a remote monitoring tool in a traditional way, i.e. without any estimator unit involvement. As described with FIG. 1, any known or future remote monitoring tool may be used.

After the results of the remote monitoring analysis are received, training data set (training examples) is ready. For example, in classifications the product data is used as instances, the process data is used as features, and the predicted conditions, i.e. the results of the condition monitoring analysis, are used as classes. At step 205 a machine learning model is trained using the training examples in an iterative manner until the model fulfils in step 206 accuracy criteria. The accuracy criteria may be that outputted estimated predictions of conditions should correspond to the predictions of conditions obtained from the remote monitoring analysis. The training may be supervised learning or semi-supervised learning. When the machine learning model is using an artificial neural network, during the iterations weights of nodes in the artificial neural network based model may be adjusted.

The fulfilment of the accuracy criteria in step 206 may be verified by using a test set, separate from the training set, to determine, whether the output of the model corresponds to predicted conditions outputted by the remote monitoring tool.

When the model is determined to be accurate, i.e. the model fulfils in step 206 the accuracy criteria, the trained model will be taken into use in step 207. In other words, an estimator unit is ready to be used.

Depending on an implementation, once created trained model may be re-trained/updated periodically, in response to an explicit command, or continuously, using the principle disclosed above.

Figure 3:
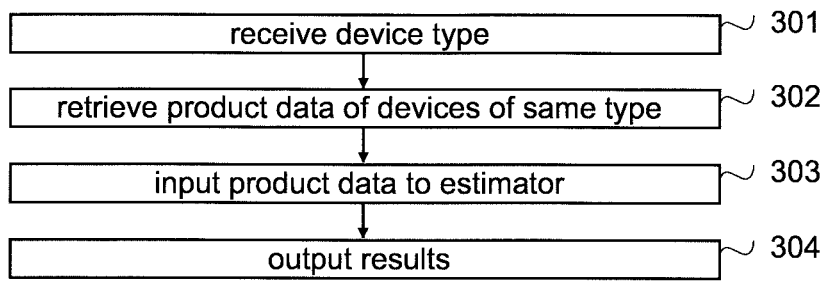
Figure 4:
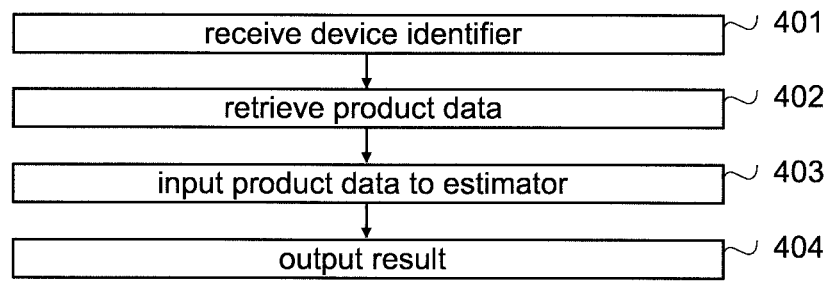
Figure 5:
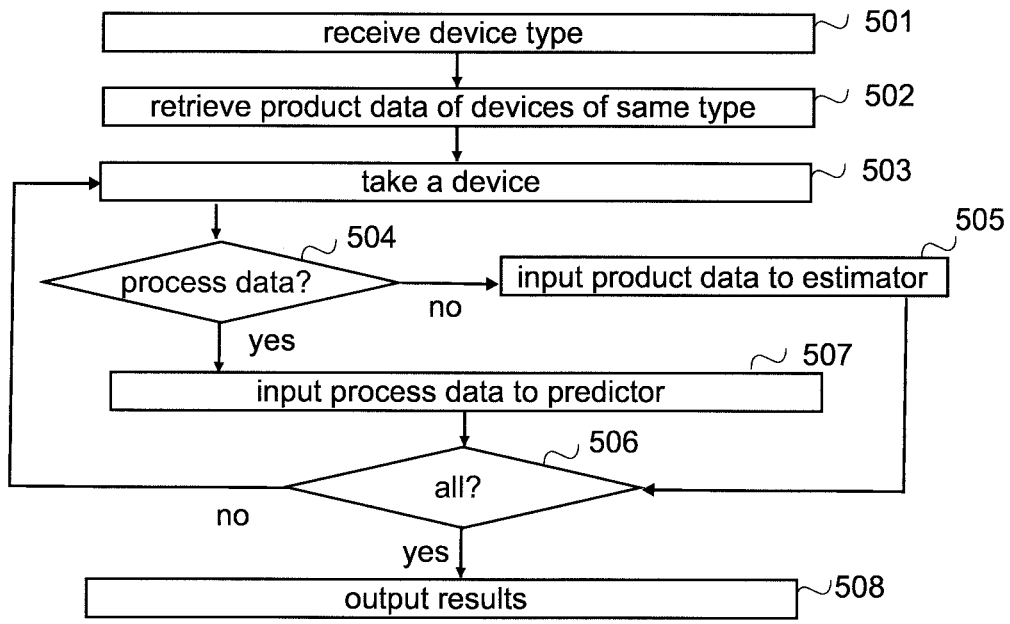

FIGS. 3 to 5 illustrate different functionalities of apparatuses configured for virtual remote monitoring, i.e. apparatuses comprising the estimator unit.

Referring to FIG. 3, when a user input comprising as input information one or more device types is received in step 301, the device type(s) is(are) used as a retrieval key and product data of devices of the same type is retrieved in step 302 from the product database, and inputted in step 303 to the estimator unit. The results from the estimator unit are then outputted in step 304. Before outputting the result, they may undergo one or more statistical processes to output the results in a more user-friendly manner, in a similar way as the remote monitoring tool would output its results. For example, when the remote monitoring tool is the condition monitoring tool, the output may be a summarized probability distribution for device condition. Using drives as an example, an output may be that "78% of installed drives are in good condition, 15% have a small risk of failure, and in 7% the predicted condition is poor and requires immediate maintenance". Another example includes a list of 105 drives having a heightened risk of insulated-gate bipolar transistor (IGBT) failure within the next two years, and the information can be used to replace IGBT units in the drives in the list, or at least perform a condition check at the sites.

Instead of the device type, the input information (industrial device type information) may be other information (industrial device type information), by means of which the device type may be determined, so that the device type may be used as a retrieval key. For example, a device identifier may be received in step 301, and from the product database a corresponding device type may be determined. Another example includes receiving information identifying a site, and from the product database device types of devices in the site may be determined.

In another implementation, all input information is used as a retrieval key. If the input information comprises, in addition to the device type, also site information, in step 302 product data of devices of the same type in the same site are retrieved.

FIG. 4 illustrates an implementation in which the estimator unit, i.e. the apparatus configured for virtual remote monitoring, is further configured to provide a user a possibility to receive an estimated prediction of one or more statuses for one or more specific industrial devices.

Referring to FIG. 4, when a user input comprising as input information one or more device identifiers is received in step 401, the device identifier(s) is(are) used as a retrieval key and product data of the devices is retrieved in step 402 from the product database, and inputted in step 403 to the estimator unit. The results from the estimator unit are then outputted in step 404. Before outputting the result, they may undergo one or more statistical processes, as described above.

In the examples described above with FIGS. 3 and 4, the apparatus comprising the estimator unit is used for virtual remote monitoring, regardless of whether there is data for the traditional remote monitoring available. Further, in the examples, the apparatus may not be configured to perform the traditional remote monitoring, i.e. use a remote monitoring tool. The difference between the different remote monitoring is that the virtual remote monitoring outputs an estimated prediction without knowledge of actual process data, whereas the traditional remote monitoring outputs a prediction, which is based on actual process data.

FIG. 5 illustrates a functionality of an apparatus configured for a combined virtual and traditional remote monitoring, i.e. having a remote monitoring tool, called with FIG. 5 a predictor, and the estimator unit, called with FIG. 5 an estimator. Further, in FIG. 5, a device type is used as an example of the input information, without limiting the example to such a solution. Any above disclosed examples and principles relating to the input information received from a user, may be implemented with the process of FIG. 5, using the above disclosed principles.

Referring to FIG. 5, when a user input comprising as input information one or more device types is received in step 501, the device type(s) is(are) used as a retrieval key and product data of devices of the same type is retrieved in step 502 from the product database. Then, from the retrieved product data, a device is taken in step 503, and in step 504 it is determined, whether there is process data on the device available (or enough process data available). If there is no process data, or not enough process data, the product data of the device is inputted in step 505 to the estimator. Then the process goes to step 506 to check whether all devices whose product data was retrieved in step 502 have been processed. If not, the process continues to step 503 to take another device.

If there is process data (step 504: yes), the process data is retrieved and input in step 507 to the predictor, and then the process continues to step 506 to check whether all devices have been processed.

Once all devices have been processed, the results received from the predictor and/or from the estimator are then outputted, perhaps after one or more statistical processes, in step 508. This time the result may comprise predictions and estimated predictions. Depending on implementation, the outputted result may indicate the predictions and estimated predictions, for example by using a mark or different colour.

As is evident from the above examples, an estimate for a predicted status will be received also to devices for which measurement data required for the remote monitoring is not available, or there is not yet enough measurement data available. Only a minority of industrial devices configured to collect and transfer process data are required to provide the virtual remote monitoring for all industrial devices whose product data is available. Even though the estimated predictions (remote monitoring results) are estimates, not based on actual process data, the estimates facilitate predictive maintenance—with the estimates, which are based on similar devices, conditions, etc., it is much more easier to determine which devices may be experiencing issues and what those issues may be, so that the maintenance can concentrate to those devices. The same applies for remote performance optimization. For example, using estimated predictions of energy consumption, it is much more easier to save energy.

Furthermore, there is no need to increase the size of the product database to contain fields for process data.

The steps and related functions described above in FIGS. 2 to 5 are in no absolute chronological order, and some of the steps may be performed simultaneously or in an order differing from the given one. Other functions can also be executed between the steps or within the steps. Some of the steps or part of the steps can also be left out or replaced by a corresponding step or part of the step. Further, the described processes, and steps within processes, may run in parallel, and features from one process (functionality) may be combined to another process (functionality).

The techniques and methods described herein may be implemented by various means so that an apparatus/equipment/a device configured to provide the virtual remote monitoring, or create/update the trained model to provide estimated predictions according to at least partly on what is disclosed above with any of FIGS. 1 to 5, including implementing one or more functions/operations of a corresponding apparatus/unit described above with an embodiment/example, for example by means of any of FIGS. 1 to 5, comprises not only prior art means, but also means for implementing the one or more functions/operations of a corresponding functionality described with an embodiment/example, for example by means of any of FIGS. 1 to 5, and the apparatus may comprise separate means for each separate function/operation, or means may be configured to perform two or more functions/operations. For example, one or more of the means and/or the estimator unit and/or the trainer unit described above may be implemented in hardware (one or more devices), firmware (one or more devices), software (one or more modules), or combinations thereof.

Figure 6:
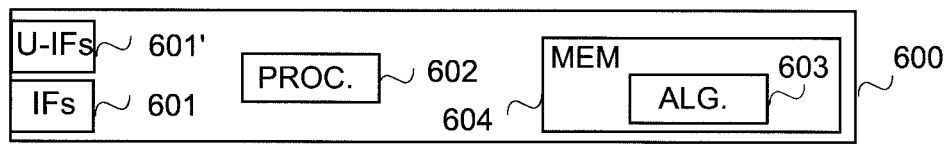
FIG. 6 is a schematic block diagram.

FIG. 6 is a simplified block diagram illustrating some units for an apparatus 600 configured to provide virtual remote monitoring, or a corresponding computing device, with the estimator unit or corresponding one or more trained models, and/or comprising at least the trainer unit, described above with FIGS. 1 to 5, or an apparatus 600 corresponding functionality or some of the corresponding functionality if functionalities are distributed in the future. In the illustrated example, the apparatus 600 comprises one or more interfaces (IF) 601 for retrieving data from one or more different databases and for receiving and/or transmitting information from or to other apparatuses, and one or more user interfaces (U-IF) 601' for user interaction, including different human-machine interfaces, one or more processors 602 configured to implement the functionality of the virtual remote monitoring apparatus, or a corresponding computing device, with the estimator unit, described above with FIGS. 1 and 3 to 5, and/or the apparatus, or corresponding computing device/equipment, comprising at least the trainer unit, described above with FIGS. 1 and 2, or at least part of corresponding functionality as a sub-unit functionality if a distributed scenario is implemented, with corresponding algorithms 603, and one or more memories 604 usable for storing a computer program code required for the functionality of the apparatus, or a corresponding computing device/equipment, with the estimator unit and/or the trainer unit, i.e. the algorithms for implementing the functionality. The memory 604 is also usable for storing the trained model, and other information.

In other words, the apparatus (device, equipment) configured to provide the virtual remote monitoring, or a corresponding computing device, with the estimator unit, and/or the apparatus comprising at least the trainer unit, or a device/equipment configured to provide one or more of the corresponding functionalities described above with FIGS. 1 to 5, is a computing device/equipment that may be any apparatus or device or equipment or node configured to perform one or more of the corresponding functionalities described above with an embodiment/example/implementation, and it may be configured to perform functionalities from different embodiments/examples/implementations. Required units and sub-units, for example the estimator unit, may be a separate unit, even located in another physical apparatus, the distributed physical apparatuses forming one logical equipment providing the functionality, or integrated to another unit in the same equipment.

The apparatus (device, equipment) configured to provide the virtual remote monitoring, or a corresponding computing device, with the estimator unit, and/or the apparatus comprising at least the trainer unit, or a device configured to provide one or more corresponding functionalities, may generally include one or more processors, controllers, control units, micro-controllers, or the like connected to one or more memories and to various interfaces of the apparatus/equipment. Generally a processor is a central processing unit, but the processor may be an additional operation processor. Each or some or one of the units/sub-units and/or algorithms described herein may be configured as a computer or a processor, or a microprocessor, such as a single-chip computer element, or as a chipset, including at least a memory for providing storage area used for arithmetic operation and an operation processor for executing the arithmetic operation. Each or some or one of the units/sub-units and/or algorithms described above may comprise one or more computer processors, application-specific integrated circuits (ASIC), digital signal processors (DSP), digital signal processing devices (DSPD), programmable logic devices (PLD), field-programmable gate arrays (FPGA), graphics processing units (GPUs), logic gates and/or other hardware components that have been programmed and/or will be programmed by downloading computer program code (one or more algorithms) in such a way to carry out one or more functions of one or more embodiments/implementations/examples. An embodiment provides a computer program embodied on any client-readable distribution/data storage medium or memory unit(s) or article(s) of manufacture, comprising program instructions executable by one or more processors/computers, which instructions, when loaded into an apparatus/device, constitute the estimator unit and/or the trainer unit, or any sub-unit. Programs, also called program products, including software routines, program snippets constituting "program libraries", applets and macros, can be stored in any medium and may be downloaded into an apparatus. In other words, each or some or one of the units/sub-units and/or the algorithms described above may be an element that comprises one or more arithmetic logic units, a number of special registers and control circuits.

Further, the apparatus (device, equipment) configured to provide the virtual remote monitoring, or a corresponding computing device, with the estimator unit, and/or the apparatus comprising at least the trainer unit, or a device configured to provide one or more of the corresponding functionalities described above with FIGS. 1 to 5 may generally include volatile and/or non-volatile memory, for example EEPROM, ROM, PROM, RAM, DRAM, SRAM, double floating-gate field effect transistor, firmware, programmable logic, etc. and typically store content, data, or the like. The memory or memories may be of any type (different from each other), have any possible storage structure and, if required, being managed by any database management system. In other words, the memory, or part of it, may be any computer-usable non-transitory medium within the processor/apparatus or external to the processor/apparatus, in which case it can be communicatively coupled to the processor/apparatus via various means as is known in the art. Examples of an external memory include a removable memory detachably connected to the apparatus, a distributed database and a cloud server. The memory may also store computer program code such as software applications (for example, for one or more of the units/sub-units/algorithms) or operating systems, information, data, content, or the like for the processor to perform steps associated with operation of the apparatus in accordance with examples/embodiments.

It will be obvious to a person skilled in the art that, as technology advances, the inventive concept can be implemented in various ways. The invention and its embodiments are not limited to the examples described above, but may vary within the scope of the claims.

What is claimed is:

1. A computer-implemented method comprising:
   receiving a user input comprising industrial device type information, which at least indicates at least one industrial device type;
   retrieving, using the industrial device type information, from a product database comprising product data of a plurality of industrial devices, product data of one or more industrial devices, which are of the same industrial device type as the at least one industrial device type indicated;
   determining, for each industrial device whose product data is retrieved, whether or not process data is available for the industrial device;
   in response to process data being available, performing a remote monitoring analysis to the process data to obtain and output one or more predictions of the at least one status;
   in response to no process data being available, performing the following:
   inputting the retrieved product data to a trained model, wherein the trained model utilizes machine learning and wherein the trained model has been trained using process data collected by a subset of the plurality of the industrial devices, predictions of at least one status generated by a remote monitoring analysis tool from the process data, and product data of the subset of the plurality of the industrial devices;
   processing, by the trained model, the inputted product data to one or more estimated predictions of the at least one status; and
   outputting the one or more estimated predictions of the at least one status.

2. The computer-implemented method of claim 1, wherein, in response to the industrial device type information comprising one or more industrial device identifiers, the retrieving comprises retrieving product data of one or more industrial devices whose industrial device identifiers were received.

3. The computer-implemented method of claim 1, wherein the inputted product data comprises at least one or multiple of product type, product configuration, manufacturing date, components in the product with their key dates, installation environment and expected loading.

4. The computer-implemented method of claim 1, wherein the remote monitoring analysis tool is a condition monitoring analysis tool and the at least one status is condition.

5. The computer-implemented method of claim 1, wherein the remote monitoring analysis tool is a remote performance optimization tool.

6. A system for obtaining estimated predictions of at least one status, the system comprising at least:
   one or more industrial devices;
   a product database comprising product data at least on the one or more industrial devices; and
   one or more apparatuses, wherein an apparatus comprises at least one processor; and at least one memory including computer program code, the at least one memory and computer program code configured to, with the at least one processor, cause the apparatus at least to perform:
   retrieving, in response to a user input comprising industrial device type information, which at least indicates at least one industrial device type, using the industrial device type information, from a product database comprising product data of a plurality of industrial devices, product data of one or more industrial devices, which are of the same industrial device type as the at least one industrial device type indicated;
   determining, after retrieving the product data, for each industrial device whose product data is retrieved, whether or not process data is available for the industrial device;
   in response to process data being available, performing a remote monitoring analysis to the process data to obtain and output one or more predictions of the at least one status;

in response to no process data being available for the industrial device, performing:
inputting the retrieved product data to a trained model, wherein the trained model utilizes machine learning and wherein the trained model has been trained using process data collected by a subset of the plurality of the industrial devices, predictions of at least one status generated by a remote monitoring analysis tool from the process data, and product data of the subset of the plurality of the industrial devices, and wherein the trained model processes the inputted product data to one or more estimated predictions of the at least one status; and
outputting the one or more estimated predictions of the at least one status.

7. An apparatus comprising:
at least one processor; and
at least one memory including computer program code, the at least one memory and computer program code configured to, with the at least one processor, cause the apparatus at least to perform:
retrieving, in response to a user input comprising industrial device type information, which at least indicates at least one industrial device type, using the industrial device type information, from a product database comprising product data of a plurality of industrial devices, product data of one or more industrial devices, which are of the same industrial device type as the at least one industrial device type indicated;
determining, after retrieving the product data, for each industrial device whose product data is retrieved, whether or not process data is available for the industrial device;
in response to process data being available, performing a remote monitoring analysis to the process data to obtain and output one or more predictions of the at least one status;
in response to no process data being available for the industrial device, performing:
inputting the retrieved product data to a trained model, wherein the trained model utilizes machine learning and wherein the trained model has been trained using process data collected by a subset of the plurality of the industrial devices, predictions of at least one status generated by a remote monitoring analysis tool from the process data, and product data of the subset of the plurality of the industrial devices, and wherein the trained model processes the inputted product data to one or more estimated predictions of the at least one status; and
outputting the one or more estimated predictions of the at least one status.

8. The apparatus of claim 7, wherein the at least one memory and computer program code are configured to, with the at least one processor, further cause the apparatus at least to perform:
in response to the industrial device type information comprising one or more industrial device identifiers, retrieving product data of one or more industrial devices whose industrial device identifiers were received.

9. The apparatus of claim 7, wherein the inputted product data comprises at least one or multiple of product type, product configuration, manufacturing date, components in the product with their key dates, installation environment and expected loading.

10. The apparatus of claim 7, wherein the remote monitoring analysis tool is a condition monitoring analysis tool and the at least one status is condition.

11. The apparatus of claim 7, wherein the remote monitoring analysis tool is a remote performance optimization tool.

12. The apparatus of claim 7, wherein the one or more industrial devices include one or multiple of a drive, a frequency converter, an AC/DC converter, a DC/AC converter, a DC/DC converter, a programmable logic controller, a switch, a motion controller, a motion drive, a servo motor, a soft starter, a wind turbine and/or a solar inverter.

13. The system of claim 6, wherein the system further comprises
a process database, wherein at least one of the one or more industrial devices are configured to collect and transfer process data to the process database; and
one or more training apparatuses, wherein a training apparatus comprises at least one processor; and at least one memory including computer program code, the at least one memory and computer program code configured to, with the at least one processor, cause the training apparatus at least to perform:
retrieving from the process database process data collected on a plurality of industrial devices;
retrieving product data of the plurality of the industrial devices;
performing remote monitoring analysis to the process data retrieved to obtain predictions of at least one status; and
training a machine learning model to be the trained model using the product data, process data and the predictions of the at least one status as training data by repeating the training until the machine learning model, using the product data as input, outputs estimated predictions of the at least one status that correspond to the predictions of the at least one status obtained from the remote monitoring analysis.

14. The system of claim 6, wherein the one or more industrial devices include one or multiple of a drive, a frequency converter, an AC/DC converter, a DC/AC converter, a DC/DC converter, a programmable logic controller, a switch, a motion controller, a motion drive, a servo motor, a soft starter, a wind turbine and/or a solar inverter.

15. A non-transitory computer readable storage medium storing one or more instructions which, when executed by one or more processors, cause the one or more processors to carry out at least:
retrieving, in response to a user input comprising industrial device type information, which at least indicates at least one industrial device type, using the industrial device type information, from a product database comprising product data of a plurality of industrial devices, product data of one or more industrial devices, which are of the same industrial device type as the at least one industrial device type indicated;
determining, after retrieving the product data, for each industrial device whose product data is retrieved, whether or not process data is available for the industrial device;
in response to process data being available, performing a remote monitoring analysis to the process data to obtain and output one or more predictions of the at least one status;
in response to no process data being available, performing:
inputting the retrieved product data to a trained model, wherein the trained model utilizes machine learning and wherein the trained model has been trained using process data collected by a subset of the plurality of the industrial devices, predictions of at least one status generated by a remote monitoring analysis tool from the process data, and product data of the subset of the plurality of the industrial devices and wherein the trained model processes the inputted product data to one or more estimated predictions of the at least one status; and outputting the one or more estimated predictions of the at least one status.

* * * * *